July 22, 1958 P. J. LONG, JR., ET AL 2,844,226
HYDRAULIC SHOCK ABSORBER
Filed July 26, 1955

INVENTORS
Paul J. Long Jr.
BY Richard L. Nietert
Their Attorney

United States Patent Office 2,844,226
Patented July 22, 1958

2,844,226

HYDRAULIC SHOCK ABSORBER

Paul J. Long, Jr., and Richard L. Nietert, Dayton, Ohio, assignors to General Motors Corporation, Detroit, Mich., a corporation of Delaware Application July 26, 1955, Serial No. 524,340

4 Claims. (Cl. 188—88)

This invention relates to a hydraulic shock absorber.

It is among the objects of the present invention to provide a double acting hydraulic shock absorber of the direct acting type with fluid flow control mechanism operative to cause the shock absorber to effect substantially light, if any, resistance to movement within a predetermined movement range of the total movement of the shock absorber elements and a predetermined greater degree of resistance to movement during other portions of the cycle of movement, and particularly to provide a free piston structurally disposed in the shock absorber in a manner that the sock absorber piston will move freely in the portion of its stroke of operation comparable to the stroke of operation of the free piston, the free piston having a structure providing a hydraulic cushion to absorb the stopping movement of the free piston.

Further objects and advantages of the present invention will be apparent from the folowing description, reference being had to the accompanying drawings wherein a preferred form of the invention is clearly shown.

Figures 1, 2, 3, 4:
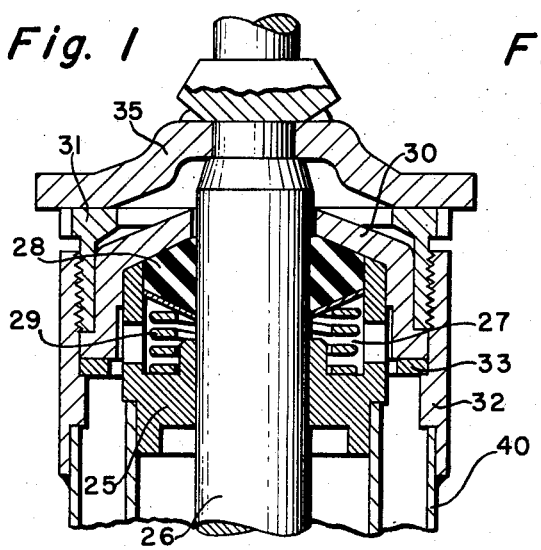
Figure 1 is a longitudinal cross sectional view of a direct acting type hydraulic shock absorber incorporating features of the present invention.
Figure 2 is a transverse cross sectional view taken along line 2—2 of Figure 1.
Figure 3 is a perspective elevational view of an abutment member used to limit the stroke of movement of the free piston of the shock absorber.
Figure 4 is a fragmentary cross sectional view similar to Figure 1 but illustrating the free piston in another of its operating positions.

The shock absorber of this invention is similar to that disclosed in the patent to George A. Brundrett, 2,695,079, dated Nov. 23, 1954, the structure disclosed and claimed herein constituting an improvement over the structure of the aforementioned patent.

The shock absorber consists of a cylinder 20. At one end of said cylinder portion 20 there is provided a closure member forming a rod guide 25 in which rod 26 is slidably supported. One end of the rod guide 25 telescopically fits into the cylinder 20 while the other end is recessed to form a chamber 27 in which the packing 28 is contained. A spring 29 seated on the bottom of chamber 27 urges the packing 28 into sealing engagement with the interior wall surface of said recess 27 and with the interior surface of a cup-shaped cap 30, fitting upon and about the recessed end of the rod guide 25, said cap being centrally apertured to permit the rod 26 to extend therethrough to the exterior of the shock absorber. An exteriorly threaded collar 31 fits about the cap 30 and seats upon an outwardly extending, annular flange on said cap. One end of a sleeve 32 is threaded to collar 31, said sleeve having an inwardly extending, annular flange providing a shoulder upon which a sealing ring 33 is pressed by the cap 30, rigidly held in this ring clamping position in sleeve 32 by the collar 31.

The end of rod 26, extending outside the shock absorber has a disc 35 secured thereto which, when the shock absorber is fully collapsed as shown in Fig. 1, engages the collar 31.

The rod 26 has a fluid displacement element or piston 80 attached thereto, which piston forms two fluid displacement chambers 81 and 82 within the cylinder. The fluid displacement member or piston 80 is attached to a reduced diameter portion 83 of rod 26. Directly engaging the shoulder 84 on rod 26 is a ring 85 against which one end of sleeve 86 abuts. The other end of said sleeve is engaged by a resilient disc-valve 87 which is also engaged by the piston 80. The piston 80 has a plurality of through passages arranged in two, concentric annular rows, those in the inner row being designated by the numeral 90 and those in the outer row by the numeral 91. Disc-valve 87, seated directly upon the piston 80 normally closes passages 91 and is perforated to maintain passages 90 open. A pressure ring 92 on the disc-valve 87 is engaged by the spring 93, surrounding sleeve 86 and abutting collar 85. This spring 93 reinforces disc-valve 87 normally, yieldably to hold the valve against the piston with a predetermined pressure.

The side of the piston 80 adjacent the cylinder chamber 82 is engaged by a resilient disc-valve 95 of such a diameter that it covers only the passages 90 in the inner annular row, the outer row passages not being affected by said valve 95. Disc-valve 95 has a slot which forms a constantly open orifice 96 of predetermined size. A solid, ring shaped and flexible dics 97 forms a yieldable backing for disc-valve 95 both disc-valve and backing disc being urged upon the piston by the clamping nut 98, threaded to the outer end of the piston rod portion 83 and rigidly holding the entire piston assembly upon the rod 26. The disc-valve 95 is reinforced by a backing ring 99 urged at a predetermined pressure upon said disc-valve 95 by the spring 100 which is interposed between said backing ring 99 and nut 98. Thus it may be seen that piston 80 has valve controlled passages providing for the transfer of fluid from one side of the piston to the other or more particularly between cylinder chambers 81 and 82, as the piston is reciprocated in the cylinder.

The sleeve 32 has one end of a tube 40 attached thereto, preferably by welding, the other end of said tube being provided with a cup-shaped cover cap 41. This tube provides an annular chamber around the cylinder 20 which forms the fluid reservoir 24. Inside this cover cap 41 there are several, spaced ribs 42, upon which rests the end closure member 45 in the form of a valve cage telescopically fitting into and seating upon the end of the cylinder portion 20. This valve cage 45 and its oppositely acting valves is of the type forming the subject matter of the Patent 2,583,169, issued to Mearick Funkhouse on January 22, 1952. The valve cage 45 has a central opening 46 surrounded by a ridge forming a valve-seat 47 on the side of the cage adjacent the interior of the cylinder 20. A disc-valve 48, termed the "intake valve," engages valve-seat 47 to close opening 46, said disc-valve having a cylindrical extension 49 of lesser diameter than opening 46 extending through said opening. A central opening in the disc-valve 48 slidably receives the recessed end of a plug type, pressure relief valve 50, an outwardly extending, annular flange 51 on said plug valve engaging the inner side of said disc-valve to close the central opening therein. A slot 52 in the side wall of the recessed end of tthe plug valve 50, normally within the confines of the disc-valve opening, is adapted to open restricted communication between the two sides of the disc-valve 48 when said plug valve is moved outwardly relatively to said disc-valve a predetermined distance. A spring 53, interposed between the plug-valve 50 and a perforated abutment plate secured within the cylindrical extension 49, yieldably maintains the flange 51 of said plug-valve in engagement with the disc-valve 48. A ring shaped member 54, with radial spring fingers 55, is secured to the inner side of the valve-cage 45, the fingers 55 engaging the disc-valve and yieldably maintaining it upon valve-seat 47. The free ends of the spring fingers 55 are in juxtaposition to a cylindrical extension on the disc valve and thereby maintain said disc-valve in proper axial alignment with the seat 47. A ring 60 fitting within the cylinder 20 and resting upon the valve-cage 45 forms an abutment to limit the movement of a free and unattached piston 70 toward the valved closure member 45.

An abutment member 22 in the form of an annular ring is positioned in the cylinder 20 between the piston 80 and the valved closure member 45 to provide a stop member to limit the movement of the free piston 70 toward the piston 80.

The abutment member 22 is illustrated in Fig. 3 as an annular ring formed in the shape of a cone. When the ring 22 is deformed into a planar ring in the manner shown in Fig. 1, the sharp peripheral edge of the ring will imbed in the surface of the cylinder 20 to fixedly position the abutment 22 in the cylinder 20. The peripheral diameter of the ring 22, in the form illustrated in Fig. 3 just fits within the diameter of the cylinder 20 so that when the ring is deformed into the planar condition shown in Fig. 1, the peripheral diameter of the ring will expand to cause the edge of the ring to imbed in the surface of the cylinder 20.

An unattached free piston 70 is reciprocative in cylinder 20 between the abutment 22 and the ring 60 on the valve-cage 45. This piston 70 is similar in construction to valve-cage 45 excepting however, that it has no outside shoulder as does the valve-cage but is provided with a tubular skirt of predetermined length and slidably fitting cylinder 20. It has an intake, disc-valve 71, a pressure relief valve 72 and springs 73 and 74 normally, yieldably holding said respective valves upon their seats similarly to the corresponding elements of the valve-cage 45.

The piston 70 has the lower face thereof provided with an angularly disposed surface 110 disposed around the central valve opening 111. A movable wall member 112 in the form of an annular ring has the inner peripheral edge 113 seated in an annular recess 114 provided in the lower face of the piston 70 whereby to retain the movable wall member 112 in position on the piston 70.

The outer peripheral edge 115 of the wall member 112 is disposed in predetermined spaced relationship relative to the inner surface of the cylinder 20 whereby to provide a resistance passage 116 between the wall member 112 and the wall of the cylinder 20.

The angular face 110 on the piston 70 cooperating with the movable wall member 112 forms a chamber 118 that receives hydraulic fluid from the cylinder 20 below the piston 70. The wall member 112 is in the form of a spring member so that normlly it is in the position illustrated in Fig. 4 in spaced relationship to the angular face 110 on the piston 70.

The hydraulic fluid filling the chamber 118 provides a hydraulic cushion to stop downward movement of the piston 70 when the wall member 112 strikes the abutment ring 60 during the compression stroke of operation of the shock absorber piston 80, fluid in the chamber 118 escaping from the chamber through the resistance passage 116 and a passage 150 between opposite ends of the abutment ring 60.

When valves 48 and 50 of the valve cage 45 and valves 71 and 72 of the free piston 70 are in the closed positions shown in Fig. 4, shock absorber fluid is trapped in the chamber between the free piston 70 and the valve cage 45 in sufficient volume to position the free piston 70 in spaced relation to the valve cage 45 and against the abutment ring 22. Should any one of the valves leak and allow escape of fluid from the aforesaid chamber during prolonged inactivity of the shock absorber and thereby allow the free piston 70 to gravitate to a position with the wall 112 resting on the ring 60, the first active movements of the shock absorber causing fluid flow to and from the reservoir 24 will fill the chamber and space the free piston 70 from the valve cage 45.

The shock absorber of the present invention is primarily adapted for use on a vehicle and is mounted between the sprung mass, the body carrying frame of the vehicle and the unsprung mass, the axle for the wheels of the vehicle. As the shock absorber is expanded or collapsed in response to the relative movement of the frame and axle of the vehicle, fluid is displaced within the shock absorber. Fuid displacement within the shock absorber is restricted and this fluid restriction causes the shock absorber to resist the movements of said frame and axle, the degree of such resistance being in accordance with the amount of restriction to the fluid displacement. In motor driven vehicles which are operated over all kinds of road beds, the shock absorbers preferably offer little or no resistance to movements under certain conditions and under others provide the greatest resistance. When a motor vehicle is operated over a road bed having successive, small humps or obstructions, such a road bed being termed the "wash-board type," it is preferable that the shock absorber offers little resistance, thereby permitting the wheel and axle, to which said shock absorber is attached, dance freely and thus substantially freely actuate the shock absorber without appreciably affecting the sprung mass. However where comparatively larger obstructions are met by the vehicle wheels and the amplitude of movements become more extended, then the shock absorber should become effective to control the resultant relative movements between the sprung and unsprung masses of the vehicle and thereby provide a comfortable ride.

Assuming that a motor vehicle equipped with a shock absorber of the present invention, is being driven over a wash-board type road, the small obstruction, when met by a wheel, will thrust the axle upwardly, moving the cover cap 41 and its engaging cylinder 20 and tube 40 and other elements connected thereto upwardly, thereby causing relative movement between the piston 80 and its containing cylinder 20. This is termed the "compression stroke" and for purposes of this description the piston 80 will be referred to as moving downwardly in the cylinder during this cycle of movement. As the piston 80 moves downwardly it exerts pressure upon the fluid in chamber 82 causing said fluid to flow through the constantly open orifice 96 in valve 95, enter and pass through piston passages 90 and the opening in valve 87 into the other cylinder chamber 81. Inasmuch as chamber 81 contains the piston rod 26 and thus cannot receive all of the fluid displaced from chamber 82 which does not contain a rod as does the chamber 81, the fluid displaced by rod 26 will exert a pressure upon the unattached piston 70 urging it downwardly, away from the abutment 22 against the body of liquid trapped between the free piston 70 and the valve cage 45. As the unattached piston 70 is pressure moved toward the valve cage 45 at the bottom end of cylinder portion 20 the plug type pressure relief valve 50 will be caused to be moved against the opposing effect of the comparatively light spring 53 thereby to move the side opening 52 in said valve outside the confines of the disc valve 48 and thus establish flow from within the space between the free piston 70 and the valve cage 45 through the disc valve 48 into the space beneath the valve cage 45 which space is in communication with the fluid reservoir 24. The unattached piston 70 will move under the influence of the downwardly moving piston 80 until the unattached piston engages the ring 60, after which continued fluid displacement from chamber 82 will move valve 72 against the opposing effect of spring 73, which is heavier than spring 53 of valve 50, to establish a restricted flow from cylinder portion 82 through the still open valve 50 into the reservoir.

When the piston 70 moves to the end of its downward stroke during the compression stroke of the shock absorber piston 80, the movable wall 112 on the lower end of the piston 70 engages the abutment ring 60 to stop movement of the piston 70 and prevent engagement of any part of the piston 70 with the valve mechanism in the valved closure member 45. Engagement of the movable wall 112 with the abutment ring 60 will cause the wall 112 to move toward the face 110 of the piston 70 and effect discharge of fluid from the chamber 118 through the resistance passage 116 provided between the wall 112 and the wall of the cylinder 20 whereby to hydraulically cushion the engagement of the piston 70 with the abutment ring 60, and thereby eliminate any pounding or clicking noise of engagement of the parts.

The present shock absorber is designed so that substantially one inch of downward travel of piston 80 will move the unattached piston 70 from engagement with the abutment 22 into engagement with the ring 60. Any shorter movement of piston 80 downwardly will not cause the unattached piston to move through its entire range of travel and thus for these shorter movements of piston 80, valve 72 in the unattached piston will remain closed and fluid will not be displaced from the cylinder chamber 82 into the interior of the cylinder portion beneath the unattached piston. But the shorter movements of piston 70 will still cause fluid to be displaced from the cylinder chamber below the piston 70 through the lightly resisted action of valve 50 on downward movement of the piston 70, fluid being returned to the cylinder chamber below piston 70 from the reservoir chamber 24 through the low resistance action of disc valve 48 on upward movement of piston 70. Thus the body of fluid below the piston 70 acts as a resilient means to normally urge the piston 70 against the abutment 22.

When the piston 80 starts to move in the opposite or upward direction, having forced the unattached piston 70 downwardly against the ring 60, the unattached piston will follow the upward movement of piston 80 until the unattached piston again engages the abutment 22 as a result of the inflow of hydraulic fluid from the reservoir 24 into the cylinder portion below the piston 70. During this upward movement of the unattached piston 70 away from the valve cage 45, disc valve 48 on the cage will be lifted against the opposing effect of the comparatively light spring fingers 55, thereby establishing a substantially free flow of fluid from the reservoir 24 into the interior of cylinder portion below the piston 70. Continued upward movement of piston 80, after the unattached piston 70 has engaged the abutment 22 will cause the disc-valve 71 to be lifted against the effect of spring fingers 74 thereby to establish a substantially free flow of fluid from the cylinder portion below the piston 70 into the cylinder portion above the piston 70.

The flow of fluid from the reservoir 24 is necessary because not sufficient fluid is displaced from the rod containing chamber 81 to fill chamber 82 as the piston 80 moves upwardly, thus an amount of fluid substantially equal to that displaced by the piston rod must be provided from the fluid reservoir 24 in order to prevent starvation of the chamber 82.

When the road wheel of the vehicle strikes a larger obstruction and the axle is thrust upwardly more violently and a greater distance than when operating over a washboard type roadbed, the downwardly moving piston 80 will exert a pressure upon the fluid in chamber 82 which cannot be relieved by the orifice 96 alone. For the first one inch travel downwardly of piston 80, the unattached piston 70 is moved from normal position in which it engages abutment 22 as shown in Fig. 4, into the position as shown in Fig. 1 in which said unattached piston engages the ring 60 on valve cage 48. As the piston 80 continues to move downwardly the fluid pressure not relievable by the orifice 96 alone will actuate valve 87 to establish a restricted fluid flow from chamber 82 through piston passages 91 into the chamber 81. Valve 87 is so designed that it will open to relieve fluid pressure within chamber 82 before valve 72 in the unattached piston 70 opens. The fluid displaced by rod 26 will cause valve 72 to open and establish a restricted fluid flow from chamber 82 through valve 50 into the reservoir, valve 50 having been opened as the unattached piston has moved to engage the ring 60.

When piston 80 is moved upwardly in cylinder 20 in response to the rebound movement of the sprung mass, fluid pressure in chamber 81, not being relievable by the orifice 96 will move the valve 95 against the effect of its predetermined spring load, to open passages 90 whereby a restricted fluid flow from chamber 81 past the open valve 95 is established into cylinder chamber 82.

Thus it may be seen that the present invention provides an hydraulic shock absorber capable of offering a predetermined minimum of resistance during a predetermined portion of its range of movement initially in either direction the shock absorber automatically providing increased resistance during the remaining portion of its range of movements in either direction.

While the embodiment of the present invention as herein disclosed, constitutes a preferred form, it is to be understood that other forms might be adopted.

What is claimed is as follows:

1. A hydraulic shock absorber, comprising, a cylinder having a closure member at each end one of which has oppositely acting valved passages providing for fluid interflow between the cylinder and a fluid reservoir, a reciprocative piston in said cylinder having oppositely acting valved passages for fluid interflow between opposite sides of said piston, said piston having a rod extending slidably through the other closure member, an abutment member in said cylinder between said piston and said valved closure member, and a free partition having oppositely acting valved passages similarly acting to those in said valved closure member slidable in said cylinder between said abutment and said valved closure member non-restrictively with substantially equivalent freedom of movement in either direction with the range of free movement of the partition being a predetermined fraction of the range of movement of said piston to provide thereby substantially unresisted movement of the piston in the cylinder to the extent of the range of movement of said partition, said partition having the portion thereof adjacent said valved closure member provided with a movable wall member disposed on the partition normally to provide with the partition a chamber filled with hydraulic fluid from the cylinder between said partition and said valved closure member, the said chamber forming means having a restrictive passage for flow of fluid from the said chamber upon movement of said wall member toward said partition whereby to hydraulically cushion movement of said partition toward said valved closure member upon engagement of said wall member with abutment means in said cylinder adjacent said valved closure member.

2. A hydraulic shock absorber in accordance with claim 1 in which the wall member comprises a disk, the said disk having the outer periphery closely spaced from the cylinder wall to provide therebetween the said restrictive passage.

3. A hydraulic shock absorber in accordance with claim 1 in which the wall member comprises an annular ring with the inner periphery engaging the partition to dispose the ring on the partition, the outer periphery of said ring being closely spaced from the cylinder wall to provide therebetween the said resistive passage.

4. A hydraulic shock absorber in accordance with claim 1 in which the said partition comprises a piston slidable in said cylinder between the said abutments, and said wall member comprises an annular ring disposed on the face of the partition piston adjacent the said valved closure member with the outer periphery of the said annular ring in closely spaced relationship with the cylinder wall to provide the said resistive passage to effect hydraulic cushioning of the stopping movement of the said piston upon engagement of the wall member with the abutment means adjacent the said valved closure member.

References Cited in the file of this patent

UNITED STATES PATENTS

| | | |
|---|---|---|
| 2,695,079 | Brundrett | Nov. 23, 1954 |
| 2,696,278 | Bonn | Dec. 7, 1954 |